United States Patent [19]
Jenson et al.

[11] 4,308,689
[45] Jan. 5, 1982

[54] TREE MEDICATION CAPSULE

[76] Inventors: Clark E. Jenson, Rte. #3, Blair, Nebr. 68008; Warren D. Wolfe, 222 Park Ave., Fremont, Nebr. 68025

[21] Appl. No.: 109,879

[22] Filed: Jan. 7, 1980

[51] Int. Cl.³ ............................................. A01G 29/00
[52] U.S. Cl. ...................................... 47/57.5; 215/32
[58] Field of Search ................... 128/272; 47/57.5; 206/219; 215/31–32

[56] References Cited

U.S. PATENT DOCUMENTS

| | | | |
|---|---|---|---|
| 1,999,458 | 4/1935 | Hollister | 47/57.5 |
| 2,577,780 | 12/1951 | Lockhart | 128/272 X |
| 3,367,065 | 2/1968 | Cravens | 47/57.5 |
| 3,691,683 | 9/1972 | Sterzik | 47/57.5 |
| 3,706,161 | 12/1972 | Jenson | 47/57.5 |
| 3,750,645 | 8/1973 | Bennett | 128/272 X |

FOREIGN PATENT DOCUMENTS

| | | | |
|---|---|---|---|
| 891350 | 3/1944 | France | 47/57.5 |

*Primary Examiner*—Robert E. Bagwill
*Attorney, Agent, or Firm*—O'Brien & Marks

[57] ABSTRACT

A tree medication capsule is disclosed as including a vial having a medication sealed therein by means of an end cap; the vial, medication and end cap constitute a self-contained unit which is inserted into a predrilled hole in a tree. The vial is made of frangible material so that upon breaking, as by a mallet tap on the end cap, the medication is free to escape into the tree.

10 Claims, 6 Drawing Figures

TREE MEDICATION CAPSULE

BACKGROUND OF THE INVENTION

1. Field of Invention

This invention relates to a device for feeding medication into plants and in particular to a self-contained medication capsule for delivering a medicant to the phloem layer of a treee of the like.

2. Description of the Prior Art

Trees are susceptible to a variety of diseases and deficiences which must be treated with a medicant in order for the tree to flourish. Examples of prior art devices for such treatment are set forth below.

U.S. Pat. No. 3,706,161 discloses a self-contained tree medication capsule, which performs satisfactorily for its intended purpose, that of containing the dry soluble medication until the tree sap dissolves sealant material forming part of the capsule. Thus the capsule does not include any frangible material, but on the contrary utilizes a hard plastic shell which contains only a dry mixture.

U.S. Pat. No. 3,691,683 proposes a method for injecting a liquid agent into a tree wherein a cartridge containing the liquid is hammered into the tree so that it fractures upon impact. But the cartridge is only half-way inserted in the tree so that upon fracture much of the liquid agent is wasted on the surface of the tree. This patent also requires a special tool for holding the cartridge and driving the cartridge into the tree; furthermore, another particular disadvantage is that the cartridge remains protruding from the tree leaving the tree bore open to permit insects to attack the interior of the tree.

SUMMARY OF THE INVENTION

The present invention is summarized in that a tree medication capsule is adapted to be inserted into a bore of a tree and includes a vial, a medication disposed in the vial, an end cap sealing closing the vial to retain the medication therein, the vial, medication and end cap forming a self-contained capsule which is insertable as a unit into a bore in the tree, the vial being made of a frangible material whereby an impact force applied to the end cap causes breaking of the vial to permit the medication to escape into the tree, and ridge means on the end cap to retain the capsule in the tree.

OBJECTS OF THE INVENTION

An object of the present invention is to construct a self-contained, tree medication capsule so as to be simple and economical.

This invention has another object in that a self-contained, tree medication capsule is completely inserted in a tree bore without the need for a special holding and driving tool.

It is a further object of this invention to seal a self-contained, tree medication capsule in a tree bore so that no parts thereof protrude from the tree.

The present invention has a further object in that a self-contained, tree medication capsule contains liquid medicine that may be quickly and commmpletely absorbed into the tree.

Other objects and advantages of the present invention will become apparent from the following description taken in conjunction with the accompanying drawing.

DESCRIPTION OF THE PREFERRED EMBODIMENT

Figure 1:
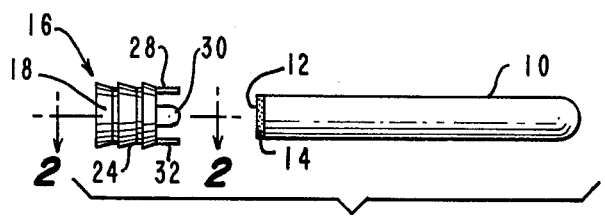
FIG. 1 is an exploded plan view of a tree medication capsule embodying the present invention.
Figure 2:
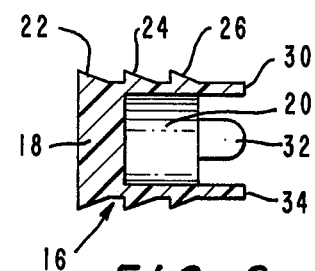
FIG. 2 is an enlarged cross sectional view of a detail taken along line 2—2 of FIG. 1.

As is illustrated in FIGS. 1 and 2, the present invention is embodied in a tree medication capsule which includes a liquid containing container and an end cap therefor. The container includes a generally cylindrical hollow container or vial 10 having an opened end 12 and an adhesive ring or strip 14 of sealing material exteriorly disposed adjacent the opened end 12. The sealing material may be made of any suitable material capable of bonding the end cap to the adjacent end of the vial 10; in this particular installation, a liquid adhesive has proved to be satisfactory. The vial 10 is made of a thin, puncturable or frangible material, such as a thin plastic or a thin onion skin glass. While the general configuration of the vial 10 is an elongated cylinder with one opened end, configurations other than cylindrical may be utilized in accordance with aesthetic conditions and/or with installation requirements.

The end cap, indicated generally at 16, is made of any suitable semi-flexible plastic material, such as polyethylene, polypropylene, or a mixture of polyethylene and polypropylene. Of course, any number of plastic materials may be used, it only being necessary that the semi-rigid or semi-flexible plastic be pliable enough to grip resiliently the exterior wall adjacent the end 12 of the vial 10 while also being rigid enough to withstand a hammer tap when the capsule is inserted in a pre-drilled hole of a tree trunk.

The cap 16 is shaped to conform to the shape of the vial portion adjacent its end 12; thus, in the preferred embodiment, the end cap 16 is a generally cylindrical shape having a first end which is defined by a thick solid wall 18 and a second opposite end which is defined by a cylindrical thin wall 20. The exterior of the end cap 16 is provided with a plurality of longitudinally spaced annular ridges which taper inwardly along its cylindrical shape in a direction away from the solid end wall 18; the present arrangement includes three annular ridges 22, 24 and 26. As is shown in FIGS. 1 and 2, the outermost annular ridge 22 is disposed around the periphery of the solid end wall 18; the intermediate annular ridge 24 is located around the periphery of part of the thin wall 20; and the innermost annular ridge 26 is disposed around the periphery of the terminal portion of the thin wall 20. The three annular ridges are of identical shape and are equally spaced from each other along the axial direction of the end cap 16.

Integral with and extending from the free end of the thin wall 20 are four equally radially spaced fingers 28, 30, 32 and 34. Since the end cap 16 is pliable and resilient, the four fingers are sufficiently pliable and resilient so as to act as compression fingers gripping the adjacent portions of the vial 10 with a clamping action; in addition the four fingers are sufficiently rigid to fracture the vial 10. Inasmuch as the four fingers are integrally molded with the entire end cap 16, each finger is slightly arcuate in transverse cross-section so as to conform to the circular shape of the vial 10 in the same manner as the inner surface of the thin wall 20.

A variety of medicines are available for feeding into trees and plants depending upon the particular disease or deficiency to be treated. Accordingly, the medicant capsule may contain any suitable medicine in any particular form, such as liquid, dry soluble materials, etc. In the preferred embodiment of the present invention, the form of the medicine is an aqueous solution which is to be introduced into the vascular system of the tree.

Figure 3:
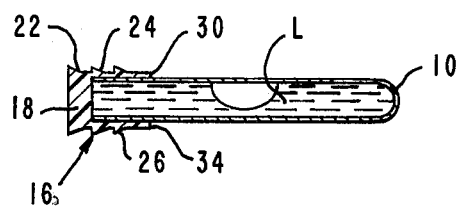
FIG. 3 is a longitudinal cross section of the capsule of FIG. 1 but showing it in its assembled relation with the medicant therein.

In the assembly of the medicant capsule, the liquid type medicine L is placed in the vial 10, then the adhesive 14 is placed around the vial 10 on the portion adjacent the opened end 12, and finally the end cap 16 is pushed over the opened end 12 until the inner surface of the solid end wall 18 firmly abuts the opened end 12 whereupon the adhesive bonds the end cap 16 to the adjacent portion of the vial 10. The assembled medicant capsule is illustrated in FIG. 3 as being in a completely sealed unitary condition ready for insertion into a tree.

Figure 4:
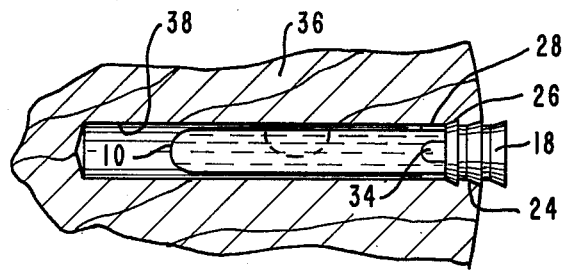
FIG. 4 is a cut-away of a portion of a tree trunk showing the capsule of FIG. 3 in a first stage of insertion therein.

As is shown in FIG. 4, a tree 36 is pre-drilled to form a blind bore 38 which has a longitudinal dimension that is longer than the longitudinal dimension of the medicant capsule; the bore 38 has a diameter larger than the diameter of vial 10 but smaller than the diameter of end cap ridges, such as ridge 22. The bore 38 is shown with its longitudinal axis on a generally horizontal plane, however, it should be noted that various inclined planes may also be utilized. The capsule is first pushed into the bore 38 by hand or by a light mallet tap on the solid wall 18, into the position shown in FIG. 4 wherein the annular ridge 26 is wedged into the wall of the bore 38 to define a first seal preventing the liquid L from escaping out of such bore.

Figure 5:
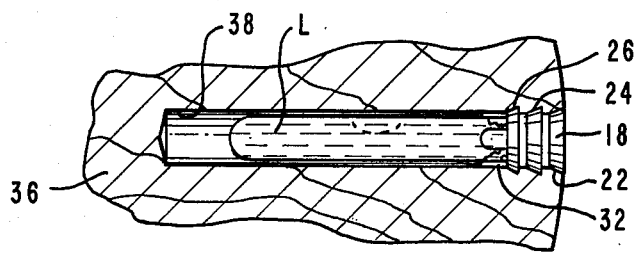
FIG. 5 is a cut-away similar to FIG. 4 but showing the capsule at a second stage of insertion.

A second mallet tap on the solid wall 18 will move the assembly into its position shown in FIG. 5 wherein the annular ridge 24 is wedged into the wall of the bore 38 to define a second seal for such bore. Of course, the annular ridge 26 has advanced into the bore 38 so there are now two spaced seals therein and the annular ridge is substantially flush with the bore opening.

Figure 6:
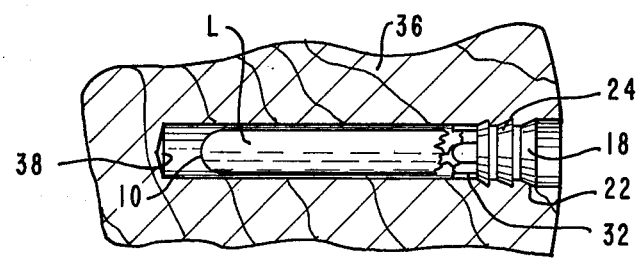
FIG. 6 is a cut-away similar to FIGS. 4 and 5 but showing the capsule in a final stage of insertion.

The insertion of the capsule is completed as shown in FIG. 6 wherein the capsule is further driven into the bore so that the annular ridge 22 and the solid end wall 18 is countersunk within the bore 38. Once again the annular ridges 24 and 26 have been advanced into the bore 38 so there are now three spaced seals in such bore to assure that the liquid L is precluded from leaking out of the bore. The solid wall 18 of the end cap 16 defines a cap for the capsule as well as for the bore 38 so that no foreign matter may enter such bore.

During the insertion of the capsule into the tree bore as described above, the wedging action between bore wall and the annular ridges causes the four fingers to exert inwardly radial forces on the vial 10 with the result that the vial 10 is fractured as shown in FIG. 6. When such fracture occurs, the liquid L escapes through the slots between the fingers 28, 30, 32 and 34 into the tree. The longitudinal location of the fingers 28, 30, 32 and 34 in the bore 38 permits the liquid to escape closer to the surface of the tree 36 thereby facilitating and accelerating the movement of the liquid L into the vascular system of the tree 36.

In the preferred embodiment, the vial 10 is made of onion skin glass which is extremely thin, so that fracturing thereof is a relatively easy operation. FIG. 6 shows the fractured condition of the vial and it should be noted that it is not necessary for the vial to be separated into two longitudinal sections but rather that the vial 10 be merely punctured or sufficiently fractured to permit the escape of the liquid L.

In its assembled relation, the end cap 16 and the vial 10 with the medicinal aqueous solution L therein form a unitary capsule. When the liquid is released from the vial, it proceeds into the bore 38 where it is absorbed through wall portions of the bore into the tree. During insertion of the capsule, the annular ridges 22, 24 and 26 locally compress fibers of the tree 36 by sliding such fibers up each annular tapered wall after which they rebound when the shoulder portions of each annular ridge is reached. When completely inserted in the tree bore 38 as shown in FIG. 6, the two innermost annular ridges 26 and 24 function as annular barbs which engage the wall of the bore to retain the capsule in the tree.

The simplicity of the present invention provides the particular advantage of being self-contained, does not require any special apparatus or any skilled labor for insertion in the tree and does not require any after treatment.

Inasmuch as the present invention is subject to many modifications and changes in structural details, it is intended that all matter contained in the foregoing description or shown in the accompanying drawing shall be interpreted as illustrative and not in the limiting sense.

What is claimed is:

1. A tree medication capsule adapted to be inserted into a bore of a tree comprising
   a vial having a diameter smaller than the bore's diameter,
   a medication disposed in said vial,
   an end cap sealingly closing said vial to retain the medication therein,
   ridge means on said end cap having a diameter larger than the bore's diameter to retain said capsule in the bore of the tree,
   finger means extending from said end cap in spaced relation to said ridge means to grip adjacent portions of said vial,
   said vial, said medication and said end cap forming a self-contained capsule which is insertable as a unit into a bore in a tree, and
   said vial being made of a frangible material whereby an impact force applied to said end cap causes breaking of the vial to permit said medication to escape into the tree.

2. A tree medication capsule as claimed in claim 1 wherein said ridge means includes a plurality of annular ridges spaced along an outer surface of said end cap.

3. A tree medication capsule as claimed in claim 1 wherein adhesive means encircles a peripheral end portion of said vial and an intermediate portion of said end cap engages said adhesive means whereby the sealingly closing of said vial is assured.

4. A tree medication capsule as claimed in claim 1 or claim 3 wherein the frangible material for said vial comprises onion skin glass.

5. A tree medication capsule as claimed in claim 4 wherein said medication is an aqueous solution.

6. A tree medication capsule as claimed in claim 1 wherein said end cap is made of a semi-flexible plastic material and comprises a first end having a solid wall abutting said vial to close the same, an opposite end having a thin hollow wall conforming to and engaging a peripheral end portion of said vial, and said finger means includes a plurality of radially spaced fingers extending from said thin hollow wall to grip spaced portions of said vial.

7. A tree medication capsule as claimed in claim 6 wherein the frangible material for said vial comprises onion skin glass and wherein said medication is a liquid medicant.

8. A tree medication capsule as claimed in claim 6 wherein said ridge means includes three annular ridges of which a first annular ridge is disposed around the periphery of said solid wall, a second annular ridge is disposed around the periphery of an intermediate portion of said thin hollow wall, and a third annular ridge is disposed around the periphery of a terminal portion of said thin hollow wall.

9. A tree medication capsule as claimed in claim 8 wherein each annular ridge tapers inwardly in a direction toward said spaced fingers.

10. A tree medication capsule adapted to be inserted into a bore of a tree, comprising the combination of a vial having a diameter smaller than the bore's diameter, a medication disposed in said vial, an end cap sealingly closing said vial to retain the medication therein, said end cap being made of semi-flexible plastic material and including a first end having a solid wall abutting said vial to close the same, an opposite end having a thin hollow wall conforming to and engaging a peripheral end portion of said vial, and a plurality of spaced fingers extending from said thin hollow wall to grip adjacent portions of said vial, a plurality of spaced annular ridges of said end cap, each of which has a diameter larger than said bore's diameter and tapers inwardly in a direction toward said spaced fingers, said annular ridges being adapted to be wedged into said tree bore to prevent leakage of the medication out of said tree bore, and one of said annular ridges cooperating with said solid wall to close and seal said tree bore, said vial, said medication and said end cap forming a self-contained capsule which is insertable as a unit into a bore in a tree, and said vial being made of a frangible material whereby an impact force applied to said end cap causes breaking of the vial to permit said medication to escape into the tree.

* * * * *